US010127016B2

(12) United States Patent
Sethi et al.

(10) Patent No.: US 10,127,016 B2
(45) Date of Patent: Nov. 13, 2018

(54) MAGNETIC RANDOM NUMBER GENERATOR

(71) Applicant: NANYANG TECHNOLOGICAL UNIVERSITY, Singapore (SG)

(72) Inventors: Pankaj Sethi, Singapore (SG); Chandrasekhar Murapaka, Singapore (SG); Wen Siang Lew, Singapore (SG); Arindam Basu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 43 days.

(21) Appl. No.: 15/411,811

(22) Filed: Jan. 20, 2017

(65) Prior Publication Data

US 2017/0212728 A1  Jul. 27, 2017

(30) Foreign Application Priority Data

Jan. 22, 2016 (SG) .............................. 10201600538P

(51) Int. Cl.
*G06F 7/58* (2006.01)
(52) U.S. Cl.
CPC ................................. *G06F 7/588* (2013.01)

(58) Field of Classification Search
None
See application file for complete search history.

(56) References Cited

U.S. PATENT DOCUMENTS

| 5,060,947 A * | 10/1991 | Hall | A63F 9/34 273/138.2 |
| 9,824,735 B1 * | 11/2017 | Kan | G11C 11/161 |
| 2004/0066674 A1 * | 4/2004 | Tang | G01L 9/0042 365/200 |
| 2016/0202954 A1 * | 7/2016 | Manipatruni | H01F 10/3254 708/250 |
| 2017/0212728 A1 * | 7/2017 | Sethi | G06F 7/588 |

* cited by examiner

*Primary Examiner* — David H Malzahn

(57) ABSTRACT

A magnetic random number generator is disclosed. The magnetic random number generator comprises: a) a Hall cross structure comprising at least one magnetic nanowire with perpendicular magnetic anisotropy; b) an in-plane pulsed current generator operable to generate stochastic nucleation of domain walls (DWs) in the Hall cross structure; and c) a sensor configured to measure a parameter of the Hall cross structure upon DW nucleation, wherein said parameter has a value representing a random number. A greater number of Hall cross structures may be employed to generate a random number having a greater number of bits.

11 Claims, 12 Drawing Sheets

MAGNETIC RANDOM NUMBER GENERATOR

CROSS-REFERENCE TO RELATED APPLICATIONS

This application claims priority to Singapore Application No. SG 10201600538P filed with the Intellectual Property Office of Singapore on Jan. 22, 2016 and entitled "MAGNETIC RANDOM NUMBER GENERATOR," which is incorporated herein by reference in its entirety for all purposes.

FIELD OF THE INVENTION

The present invention relates to a magnetic random number generator.

BACKGROUND

Random numbers are useful for a variety of purposes such as generating encrypted data and modeling complex phenomena. True random number generators tend to use atmospheric noise to generate data.

In magnetism, a domain wall (DW) is an area of gradual transition from a magnetic moment of one orientation to another. The motion of domain walls (DWs) using a technique known as spin transfer torque (STT) has paved the way for research into non-volatile magnetic memories and logic devices. The technique presently used to inject DWs into such systems utilises a localised Oersted field generated by passing a current through a metallic strip-line. However, this DW generation process is deterministic and therefore not suitable for use in a random number generator.

Recently a magnetic structure was proposed in which thermal energy was utilized to nucleate DWs. An in-plane current was passed through a nanowire to generate joule heating to trigger DW nucleation. However, a magnetic field was also applied to assist the DW nucleation and magnetization reversal. However, this reversal process is not stochastic and thus cannot be employed in a random number generator application. Furthermore, the generation of a magnetic field may not be suitable for on-chip device applications.

It is therefore an aim of the present invention to build on the above to provide a magnetic random number generator.

SUMMARY OF THE INVENTION

In accordance with a first aspect of the invention there is provided a magnetic random number generator comprising:
a) a Hall cross structure comprising at least one magnetic nanowire with perpendicular magnetic anisotropy;
b) an in-plane pulsed current generator operable to generate stochastic nucleation of domain walls (DWs) in the Hall cross structure; and
c) a sensor configured to measure a parameter of the Hall cross structure upon DW nucleation, wherein said parameter has a value representing a random number.

Thus, embodiments of present invention provide a magnetic random number generator that utilises a stochastic process of domain wall (DVV) nucleation to generate a random number. It is believed that such a device will provide a non-volatile, low power alternative to known random number generators.

It is believed that natural anisotropy gradients at the intersection of the Hall cross structure leads to the stochastic generation of DWs when in-plane current pulses are applied. The DW nucleation process originates from the intersection due to higher demagnetization energy and spin transfer torque (STT). The spins at the four corners of the Hall cross structure are canted and experience lesser exchange interaction. The combination of in-plane current and joule heating can trigger the magnetization reversal process. The nucleation process is found to be stochastic due to magnetic switching of different regions of the structure for each identical current pulse and the number of DWs generated is also different each time. The presence or absence of DWs at the junction of the Hall cross structure changes the Hall parameters (e.g. resistance and potential difference) which can be measured to provide a value representing or constituting a random number. Variation in the Hall parameters therefore leads to generation of random numbers. Moreover, the value of the Hall parameter can be read directly with no need for additional magnetic read heads.

Conventionally, Hall cross structures are employed for electrical detection of magnetisation reversal wherein a domain wall (DW) is nucleated using a localised Oersted field. In contrast, embodiments of the present invention employ nucleation of DWs in Hall cross structures using an in-plane pulsed current as opposed to a localised Oersted field. This feature ensures greater reliability as the local environment will not affect the nucleation process.

One Hall cross structure may be used to generate one bit of a random number. Additional Hall cross structures can be incorporated to generate a random number with additional bits (i.e. a longer random number).

The Hall cross structure may comprise a magnetic or non-magnetic metal (e.g. Tantalum) Hall bar.

The anisotropy of the magnetic nanowire is perpendicular.

The parameter may be resistance or potential difference.

The width of the nanowire may be 500 nm or more (e.g. 1 µm or more, 2 µm or more or 3 µm or more). In other embodiments, the width of the nanowire may be less than 500 nm (e.g. 10 nm to 100 nm) if the anisotropy is low, for example, around $1 \times 10^5$ ergs/cc.

The in-plane pulsed current generator may be configured to generate current pulses having a current density of $1 \times 10^{11}$ A/m$^2$ and above or $1 \times 10^{10}$ A/m$^2$ and above, depending on the anisotropy (e.g. $5 \times 10^{11}$ A/m$^2$, $10 \times 10^{11}$ A/m$^2$ or $15 \times 10^{11}$ A/m$^2$ or above). For lower anisotropy (around $1 \times 10^5$ ergs/cc) the required current density would be lower (e.g. $\mathbf{1 \times 10^{10}}$ A/m$^2$ to $9 \times 10^{10}$ A/m$^2$).

The in-plane pulsed current generator may be configured to generate current pulses having a pulse width of 20 ns or greater depending on the anisotropy (e.g. 30 ns, 40 ns, 50 ns, 60 ns, 70 ns, 80 ns, 90 ns or 100 ns or greater). For lower anisotropy the required pulse width may be lower (e.g. 1 ns, 5 ns, 10 ns or 15 ns).

In accordance with a second aspect of the invention there is provided a method of generating a random number comprising:
a) generating stochastic nucleation of domain walls (DWs) in a Hall cross structure comprising at least one magnetic nanowire with perpendicular magnetic anisotropy using an in-plane pulsed current; and
b) measuring a parameter of the Hall cross structure upon DW nucleation, wherein said parameter has a value representing a random number.

BRIEF DESCRIPTION OF THE DRAWINGS

Embodiments of the invention will now be described, by way of example only, with reference to the following drawings, in which.

DETAILED DESCRIPTION

Figure 1:
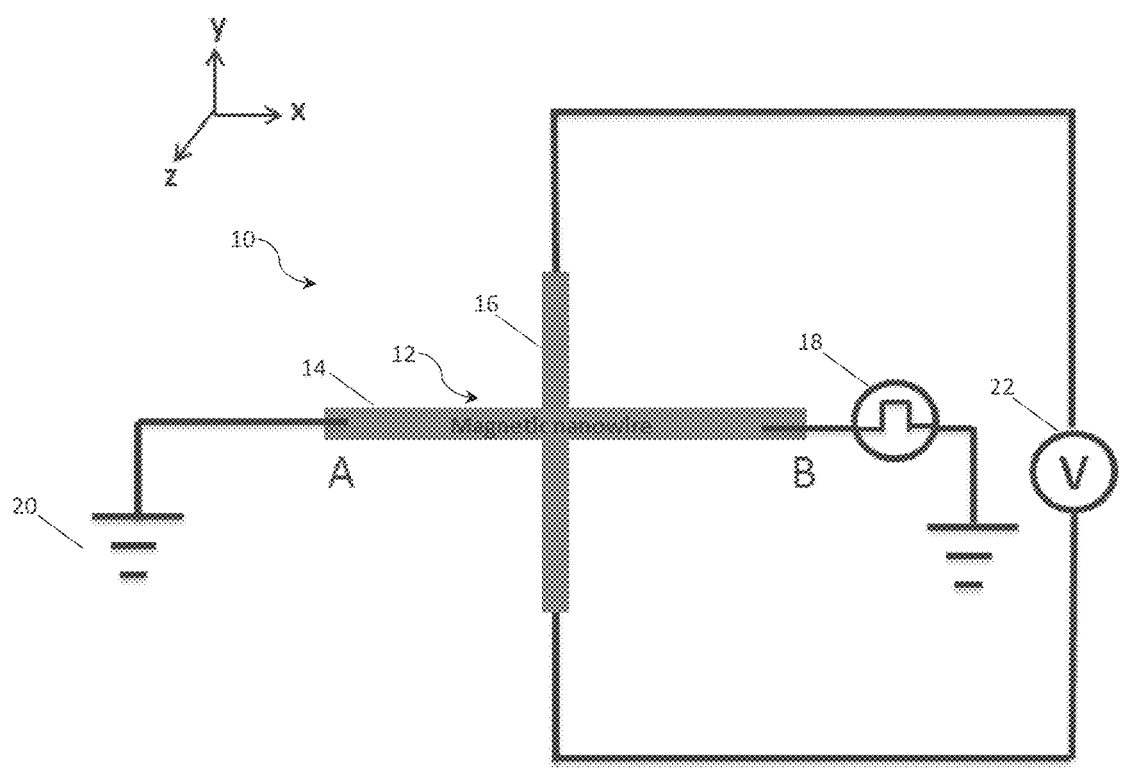
FIG. 1 is a schematic diagram of an embodiment of the invention.

In accordance with a first embodiment of the present invention there is provided a magnetic random number generator (MRNG) 10 as illustrated in FIG. 1. The magnetic random number generator 10 comprises a perpendicular magnetic anisotropy (PMA) Hall cross structure 12 comprising a first nanowire arm 14, extending in the x-direction as drawn, between terminals A and B and a second nanowire arm 16, extending in a y-direction as drawn, through the centre of the first nanowire arm 14. An in-plane pulsed current generator 18 is connected to terminal B and configured to generate stochastic nucleation of domain walls (DWs) in the Hall cross structure by sending current pulses through the Hall cross structure 12. Terminal A is connected to earth 20 and a sensor 22 in the form of a voltmeter is connected between the ends of the second nanowire arm 16 to (indirectly) measure a parameter such as resistance ($R_{Hall}$) of the Hall cross structure 12 upon DW nucleation. As will be understood by those skilled in the art, by measuring the potential difference (V) using the voltmeter and knowing the current (I) in the system, the resistance (R) can be calculated using Ohm's law (R=V/I). Thus, in operation, the resistance will be calculated from the measured potential difference and this will provide a value representing a random number. In other embodiments, the potential difference (V) itself may constitute the parameter that represents a random number and the resistance need not be calculated.

The Hall cross structure 12 in this embodiment is composed of a film stack having the following materials and thicknesses (in nm) Ta(3)/Pt(3)/Co(0.25)/[Ni(0.5)/Co(0.25)]$_4$/Pt(3)/Ta(3) sputter deposited on a thermally grown SiO$_2$ substrate. In other embodiments, the thickness of the Cobalt layers can range from 0.15 to 0.3 nm and the thickness of the Nickel layers can range from 0.4 to 0.6 nm. Furthermore, the stack repetition of Ni/Co which is 4 in the above embodiment can be varied from 1 to 4. Thus, in this embodiment, the Hall cross structure comprises a magnetic Hall bar. In other embodiments, the Hall cross structure may comprise a non-magnetic Hall bar, for example, comprising Tantalum (Ta) or other metals.

In one experiment, a constant 50 μA bias current (I) was applied to the second nanowire arm 16 to saturate the Hall cross structure 12 in the z-direction. The in-plane pulsed current from the pulsed current generator 18 was then applied from terminal B to A to trigger DW nucleation in the Hall cross structure 12. In this experiment, the magnitude of the pulsed current was varied from 6.8×10$^{11}$ A/m$^2$ to 1.52×10$^{12}$ A/m$^2$ while keeping the pulse width constant at 50 ns. The presence of DWs was detected using the anomalous Hall effect (AHE) as the Hall resistance ($R_{Hall}$) is proportional to the perpendicular magnetization of the Hall cross structure 12.

Figure 2A:
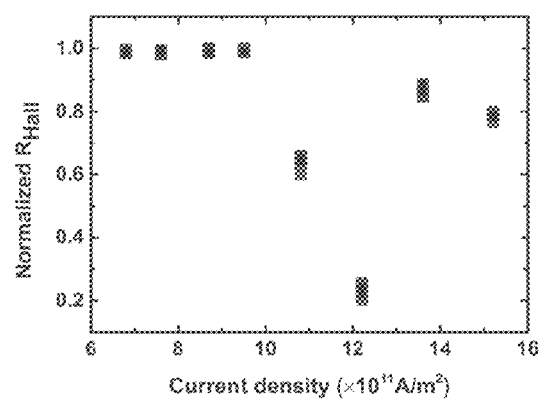
FIG. 2(a) shows the statistical distribution of normalized Hall resistance ($R_{Hall}$) as a function of current density.

FIG. 2(a) shows the variation of normalized Hall resistance ($R_{Hall}$) as a function of current density for the above structure wherein the width of each arm of the Hall cross structure 12 is 500 nm. Each measurement was repeated 20 times to obtain a statistical distribution of results. When the applied current density for the pulsed current was relatively low, there was no significant change in the magnitude of $R_{Hall}$, indicating no change in the magnetization of the Hall cross structure 12. However, when the current density was increased to $1.08 \times 10^{12}$ A/m² there was a reduction in the magnitude of $R_{Hall}$. This indicates nucleation of DWs near the junction of the Hall cross structure 12 (i.e. at the intersection of the first nanowire arm 14 and the second nanowire arm 16). The probability of DW nucleation is higher near the junction of the Hall cross structure 12 due to higher demagnetization energy. The higher demagnetization energy lowers the anisotropy at the corners of the junction due to canting of magnetic spin moments. The magnitude of $R_{Hall}$ depends on the magnetic volume switched at the junction. The extent of spread in $R_{Hall}$ indicates the non-uniformity in reversed magnetization volume at the junction, which clearly exhibits the presence of stochasticity in the DW nucleation process.

Figure 2B:
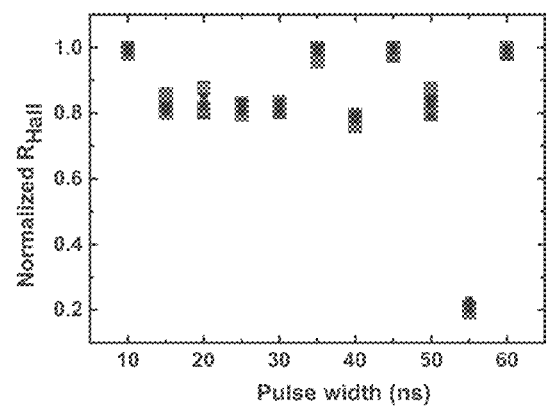
FIG. 2(b) shows the statistical distribution of normalized Hall resistance ($R_{Hall}$) as a function of pulse width.

The effect of pulse width modulation on $R_{Hall}$ was also studied keeping the current density constant. FIG. 2(b) shows the variation in normalized $R_{Hall}$ after application of a pulsed current, for various pulse widths keeping the current density constant at $1.22 \times 10^{12}$ A/m². Each of the measurements was repeated 20 times to obtain a statistical distribution of results. The trend in $R_{Hall}$ is similar to the one obtained previously in FIG. 2(a). When the pulse width is low (i.e. 10 ns), there is no reduction in $R_{Hall}$. This implies that at a low operating power, current alone is insufficient to reverse the magnetization in the Hall cross structure 12. From FIG. 2(b) it is observed that for pulse widths less than 15 ns there is no drop in $R_{Hall}$, indicating no DW nucleation at the junction. When the pulse width is between 15 ns to 50 ns, the $R_{Hall}$ varies between 1 and 0.8 indicating either no reversal or slight reversal at the corners of the junction. At 55 ns, $R_{Hall}$ drops to its minimum value indicating maximum reversal of magnetic domain walls at the junction of the Hall cross structure 12. On increasing the pulse width further to around 60 ns, the $R_{Hall}$ recovers to its maximum value indicating de-pinning of the DWs from the junction. This also indicates a possibility of multiple DW generation. The distribution of $R_{Hall}$ indicates the presence or absence of DWs when different pulse widths and current densities are employed. The results suggest the possibility of stochasticity in the DW generation process using in-plane pulsed current.

Figure 3:
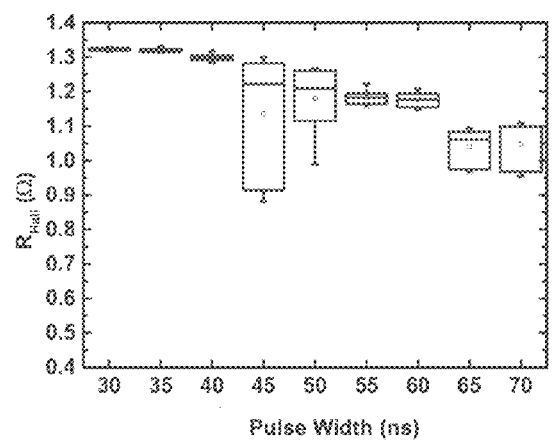
FIG. 3(a) shows the statistical distribution of Hall resistance ($R_{Hall}$) as a function of pulse width for a device with a 2 μm wide nanowire.
FIG. 3(b) shows a Kerr image of the device of FIG. 3(a) after saturation with an external magnetic field before an application of current pulse.
FIG. 3(c) shows a Kerr image of the device of FIG. 3(a) after application of a current pulse and with dark contrast at the junction indicating DWs.
FIG. 3(d) shows a Kerr image of the device of FIG. 3(a) showing multiple DWs after application of a current pulse with the same current density and pulse width as that employed in FIG. 3(c)
Figure 3:
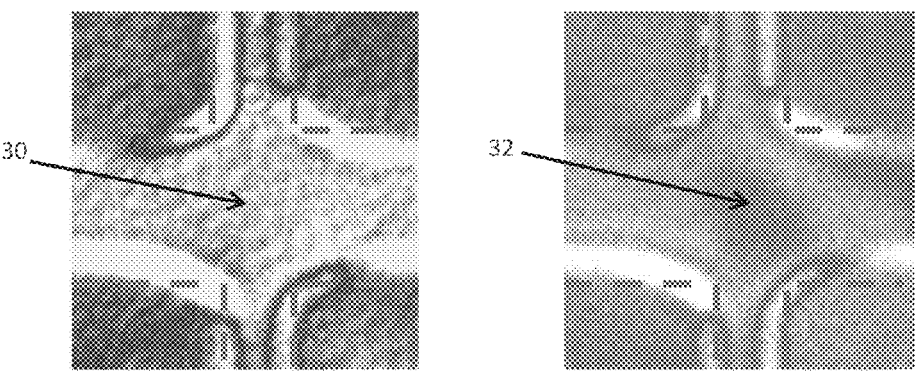
Figure 3:
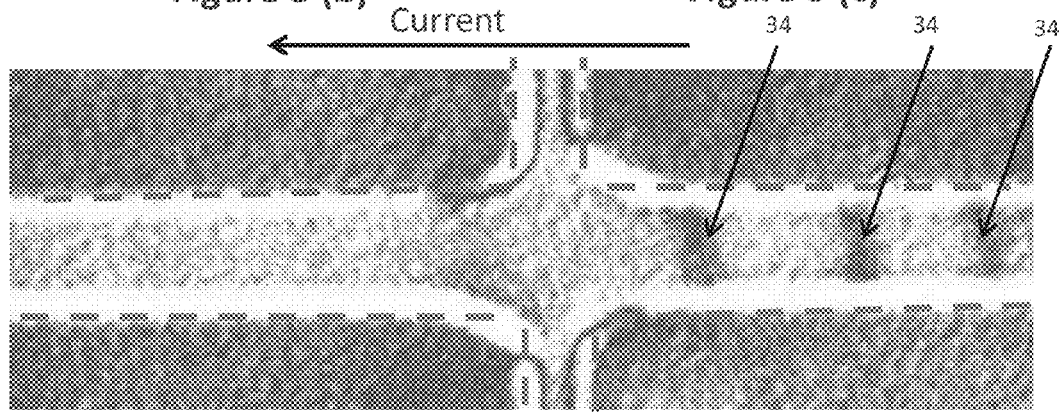

FIG. 3(a) shows a graph of normalised $R_{Hall}$ with respect to pulse width using a similar set-up to that described above but wherein the width of each arm of the Hall cross structure 12 is 2 μm. The results show a large spread of $R_{Hall}$ for individual pulse widths of 45 ns or above which indicates variation in the switched volume near the junction of the Hall cross structure 12. Thus, for the same pulse width it is possible to obtain different values for the Hall resistance and thereby obtain random numbers.

FIG. 3(b) shows a magneto-optic Kerr effect image of the junction of the Hall cross structure 12 employed in FIG. 3(a) before injection of the pulsed current. In this case, the light area 30 represents homogenous magnetization.

FIGS. 3(c) and 3(d) shows magneto-optic Kerr effect images of the junction of the Hall cross structure 12 after injection of a single current pulse. It should be noted that both images are obtained at the same current density and pulse width of 45 ns. In one case, shown in FIG. 3(c), DWs are only observed at the junction of the Hall cross structure 12 (surrounding a dark spot 32 indicating an opposite domain) and in the other case, shown in FIG. 3(d), six DWs are observed (bounding the dark lines 34 showing reversed magnetic domains). This indicates stochasticity in the DW nucleation process which can be exploited for random number generation by conversion of the measured Hall resistance into a value of a random number.

Figure 4A:
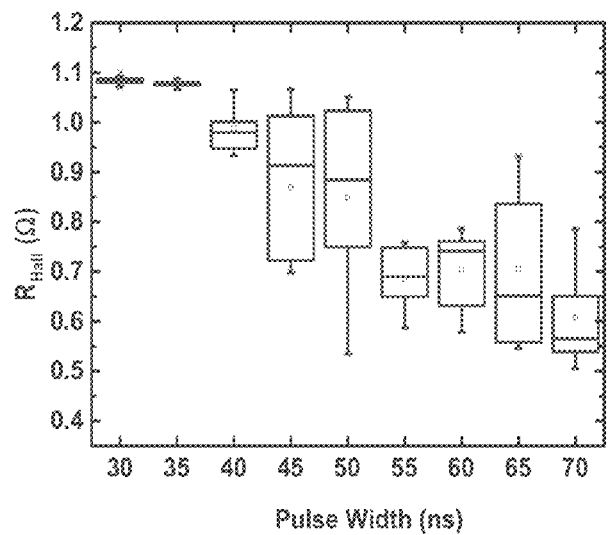
FIG. 4(a) shows a statistical distribution of Hall resistance ($R_{Hall}$) as a function of pulse width for a device with a 1.5 μm wide nanowire.
Figure 4B:
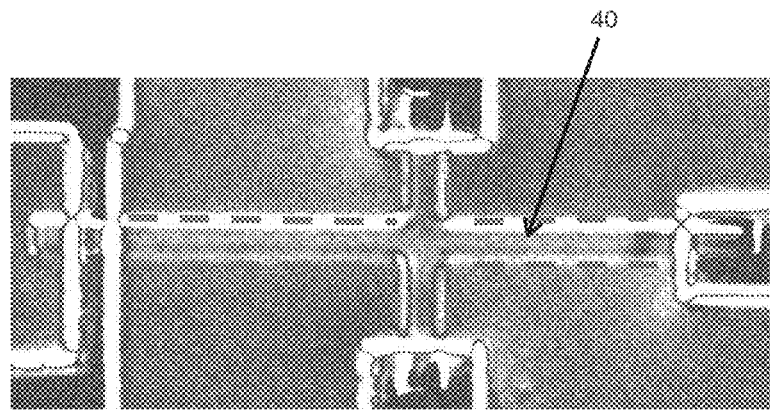
FIG. 4(b) shows a Kerr image of the nanowire of FIG. 4(a) showing one DW after application of a current pulse.
Figure 4C:
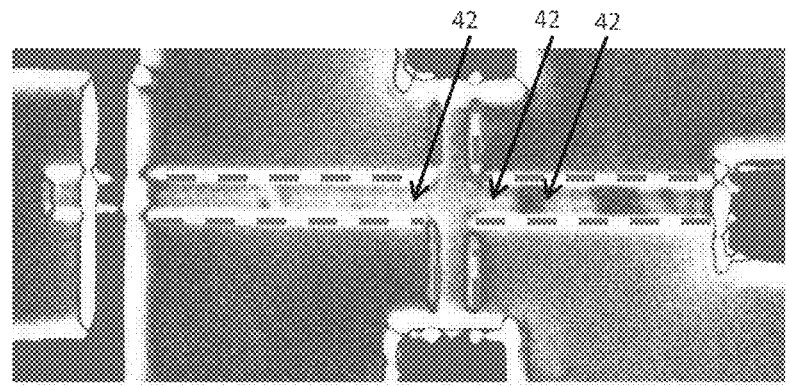
FIG. 4(c) shows a Kerr image of the nanowire of FIG. 4(a) showing multiple DWs after application of a current pulse with the same current density and pulse width as for FIG. 4(b)

Similarly, FIG. 4(a) shows a graph of normalised $R_{Hall}$ with respect to pulse width using a similar set-up to that described above but wherein the width of each arm of the Hall cross structure 12 is 1.5 μm and FIGS. 4(b) and 4(c) show magneto-optic Kerr effect images of the junction of the Hall cross structure 12 after injection of a current pulse with the same current density and pulse width of 50 ns. In FIG. 4(a) variation of $R_{Hall}$ is shown for pulse widths of 40 ns and above. Also, FIG. 4(b) only shows a single DW 40 in the Hall cross structure while FIG. 4(c) shows multiple DWs 42 for the same current density and pulse width thereby also showing stochasticity which can lead to random number generation based on a changing value of $R_{Hall}$.

Figure 5A:
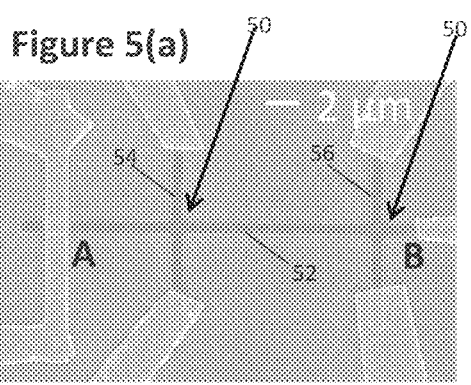
FIG. 5(a) shows an SEM image of a device according to an embodiment of the invention including two Hall bars.

FIG. 5(a) shows a scanning electron microscope (SEM) image of a further embodiment of the invention which is similar to that shown in FIG. 1 but wherein two perpendicular magnetic anisotropy (PMA) Hall cross structures 50 are employed to demonstrate a two bit random number generator. In this case, there is a common first nanowire arm 52 in the x-direction which is crossed perpendicularly by a second nanowire arm 54 in the y-direction and a third nanowire arm 56 also in the y-direction. In this experiment, an in-plane pulsed current of current density $1 \times 10^{12}$ A/m² was applied from terminals B to A at a pulse width of 50 ns.

Figure 5B:
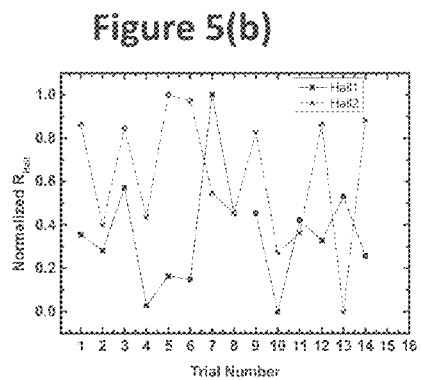
FIG. 5(b) shows anomalous Hall effect (AHE) measurements for each of the two Hall bars of FIG. 5(a) on passing the same current density and pulse width.

FIG. 5(b) shows the normalized Hall resistance, for each of the two Hall cross structures 50, for 15 different measurements. Each time a different combination of Hall resistance is observed at the two Hall cross structures 50. Consequently, this set-up could be used to generate a 2 bit random number using the Hall resistance obtained from each Hall cross structure 50.

Figure 6:
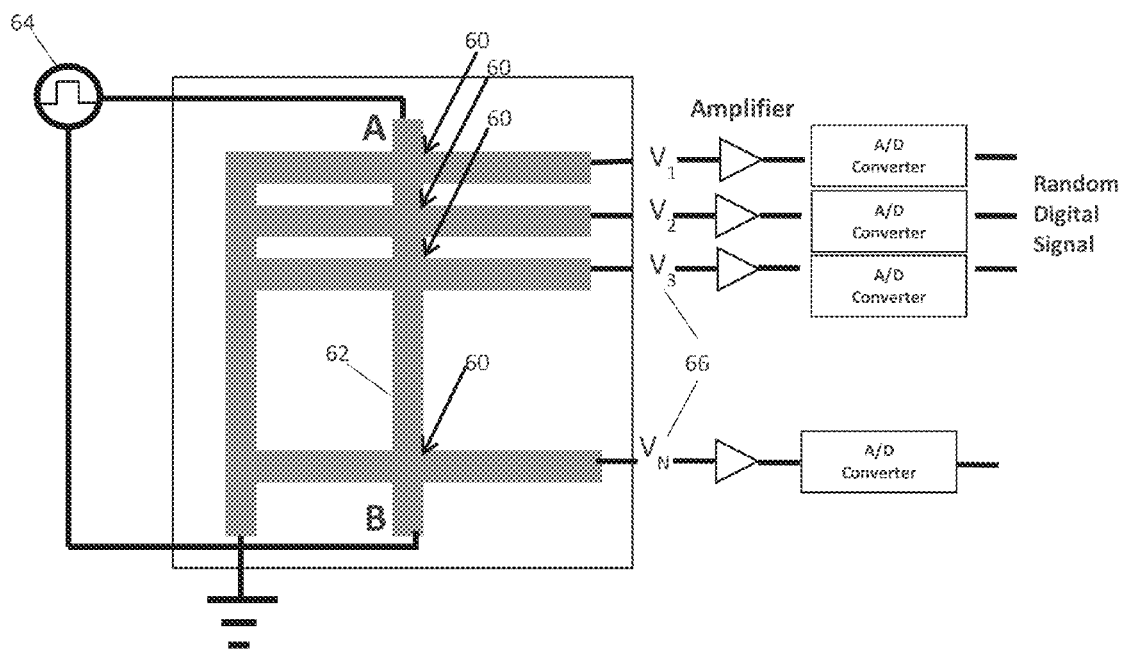
FIG. 6 shows a diagram of a device according to an embodiment of the invention including n Hall bars.

In a similar manner, it is possible to extend the above concept to create a multiple bit random number generator by increasing the number of Hall cross structures. The schematic of such a device is shown in FIG. 6 for an N bit number. Thus, N Hall cross structures 60 are employed across a common first nanowire 62 and an in-plane pulsed current is applied from terminal B to A by a current pulse generator 64. Notably, the Hall cross structures 60 can be easily integrated on a chip in a similar manner to magnetic tunnel junction devices. An analog output signal from each Hall cross structure 60 can be sensed by a sensor 66 (i.e. voltmeter $V_1$ to $V_N$) and may be amplified before being fed into an analog to digital converter to obtain a random digital output comprising N bits.

In contrast to the prior art, in embodiments of the present invention multiple DWs are nucleated and de-pinned from the Hall cross structure when current is passed through the nanowire without the assistance of any external source (e.g. magnetic field). Accordingly, embodiments of the present invention have wider application and can be used on chips and in devices where the use of magnetic fields is not desirable.

It is also believed that the proposed nanowire structure has a low hard-axis anisotropy constant ($\sim 8 \times 10^5$ ergs/cc)

which aids the reversal process leading to multiple DW nucleation in a random manner.

Circuit Design

Embodiments of the present invention relate to a plug and play random number generator utilising the Hall cross structures described above and further comprising: a) a circuit for generating current pulses of an amplitude of the order of $10^{12}$ A/m$^2$; b) a circuit for converting the random magnetic orientation of a Hall cross structure into a useful electrical signal; and c) an interface with a commercially available USB peripheral.

The Hall cross structures described above can be used to generate random differential voltages in a range of ±10-50 µV. Conventional differential amplifiers cannot be employed for detection of these small signals since they suffer limitations from input-offset and noise. Consequently, a readout circuit for a random number generator in accordance with embodiments of the invention may need to employ special techniques as outlined below.

Figure 7:
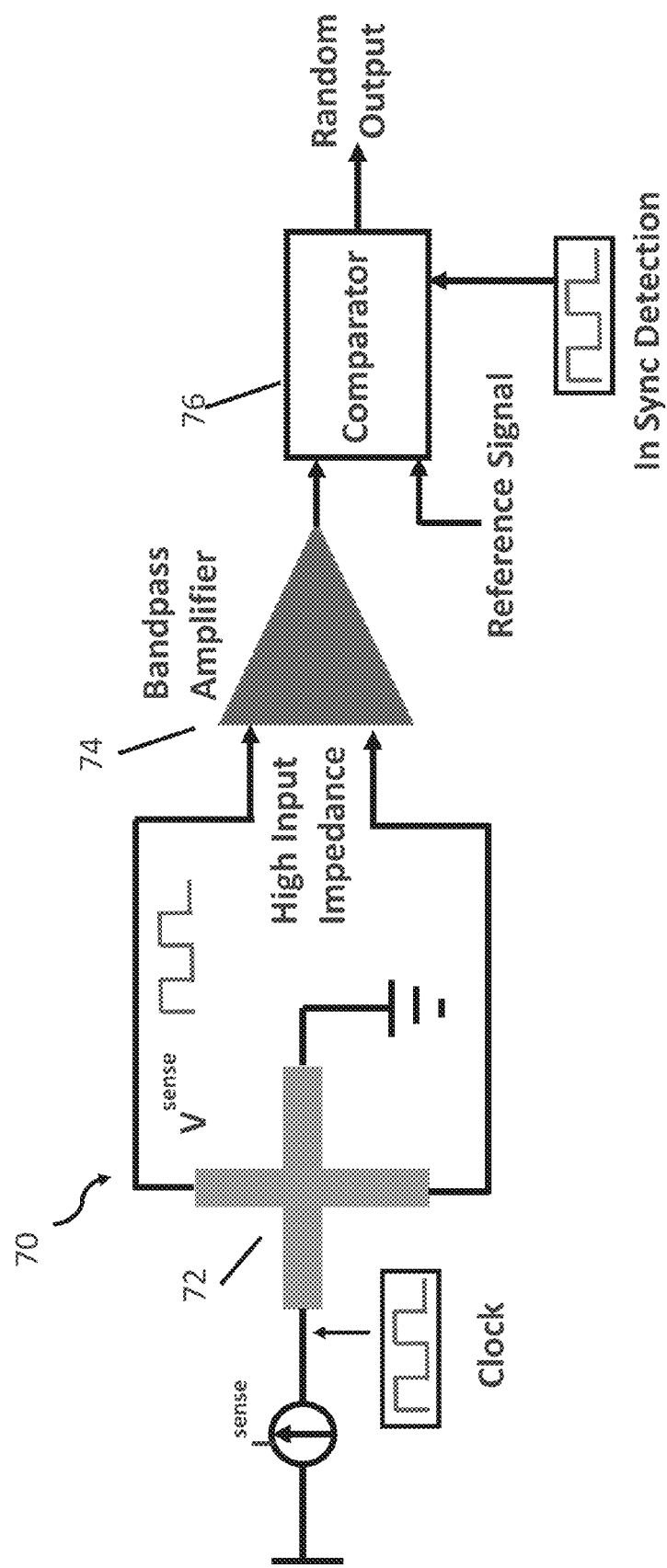
FIG. 7 shows a circuit diagram for a readout circuit for an embodiment of the invention.

An example of a proposed readout circuit 70 is illustrated in FIG. 7. In this embodiment, the sensed output of the Hall cross structure 72, $V^{sense}$ is modulated by virtue of a clocked sense current $I^{sense}$. $V^{sense}$ is passed with high input impedance through a bandpass amplifier 74 which is shown in more detail in FIG. 8 before a comparator 76 is employed with a synchronised reference signal to obtain a random number bit for each rising or falling clock edge.

The readout circuit 70 should minimally load the sensor or voltmeter. This requires a detailed electrical characterization of the Hall cross structure 72. The characterization helps in optimizing an input impedance of the readout circuit 70 for maximum bandwidth of an active filter so that the sensor output is not loaded. The readout circuit 70 design aims to minimize the noise in the circuit for achieving a throughput up to 20 MHz.

Figure 8:
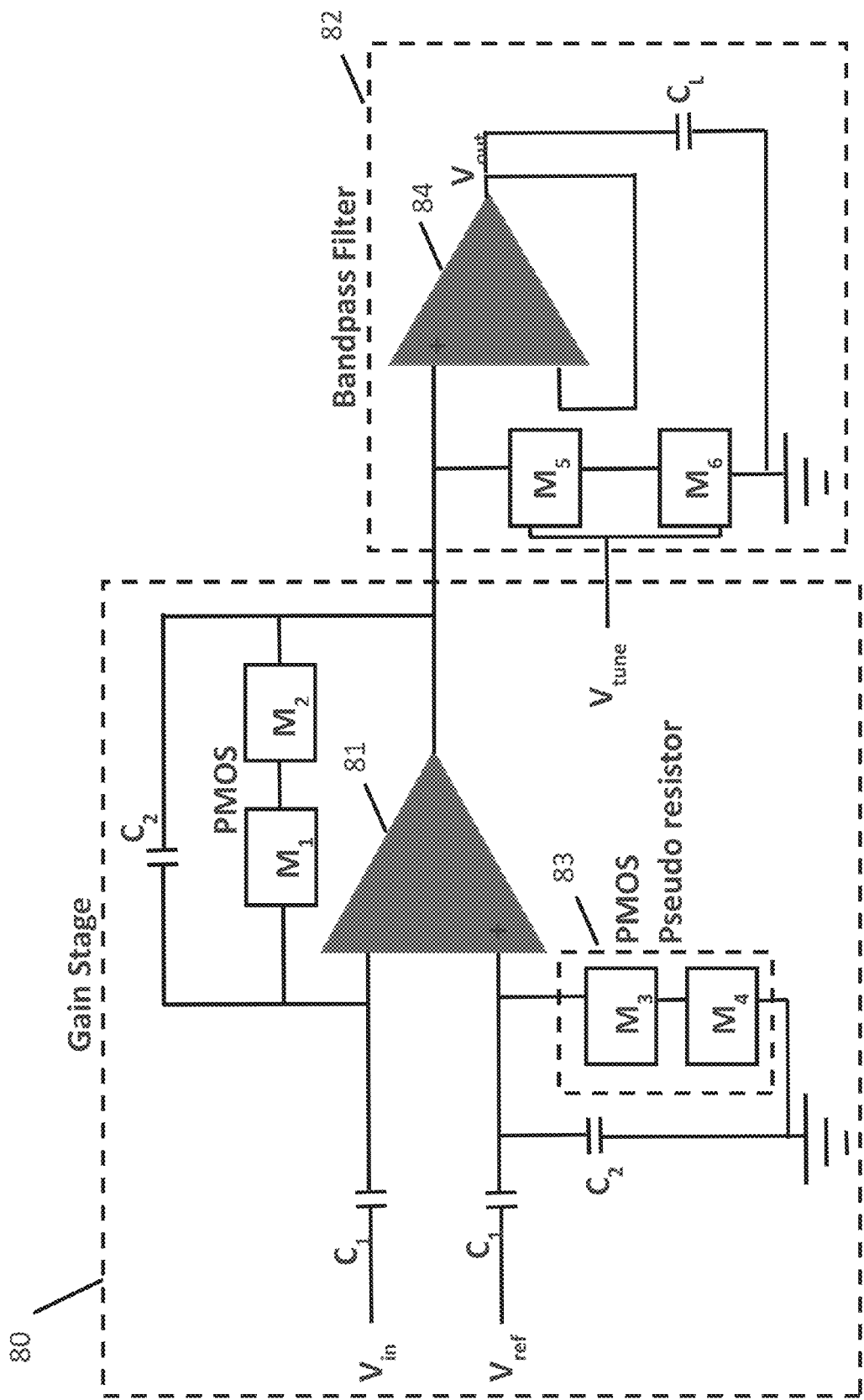
FIG. 8 shows a schematic of a capacitively coupled amplifier for use in embodiments of the invention.

As shown in FIG. 8, the first stage in detection of $V^{sense}$ is a gain stage 80 comprising a differential low-noise amplifier 81 followed by second stage bandpass filter 82. This embodiment employs capacitively coupled amplifiers similar to the ones used in neural recording. In particular, the amplifier 81 has a first input signal $V_{in}$ which passes through a first capacitor $C_1$ before entering a negative terminal and a second input $V_{ref}$ which passes through a second capacitor $C_1$ before entering a positive terminal. A feedback loop connects the output signal from the amplifier 81 and feeds it back through the negative terminal via a capacitor $C_2$, which is connected in parallel with two p-channel metal-oxide-semiconductor (PMOS) transistors $M_1$ and $M_2$. The positive terminal of the amplifier 81 is connected in parallel to a capacitor $C_2$, which is earthed and which is connected in parallel to two further PMOS transistors $M_3$ and $M_4$ (which together form a pseudo resistor 83). The output from the amplifier 81 is fed into the bandpass filter 82 and, in particular, into the positive terminal of an amplifier 84. The positive terminal of amplifier 84 is earthed through further PMOS transistors $M_5$ and $M_6$, which are driven by a tunable voltage $V_{tune}$. The output $V_{out}$ of the amplifier 84 is fed back into the negative terminal of the amplifier 84 in a feedback loop. The output $V_{out}$ is also earthed via load capacitor $C_L$. In operation, the low-noise amplifier and bandpass filter will amplify the input signal $V_{in}$ sufficiently (i.e. place it in a higher frequency band) so that the effect of noise is negligible compared to the amplified $V^{sense}$ signal. The bandwidth of the two stage bandpass amplifier 74 is therefore optimized for maximum signal to noise power. The input impedance of the amplifier can be increased with input capacitance $C_1$. The polarity of the amplified signal can also be determined using flip-flops and the detection can happen in synchrony with the modulated $I^{sense}$ current.

The amplitude of the current densities required by the magnetic Hall cross structure 72 to generate DWs suggests that the underlying complementary metal-oxide-semiconductor (CMOS) has to handle narrow pulses (e.g. of 40 ns) of amplitude close to 10V. Accordingly, the circuit (or parts of it) may need to be fabricated using a high-power CMOS process. The circuit may also exploit methods to precisely control the pulse width and amplitude of the pulsed current.

Figure 9:
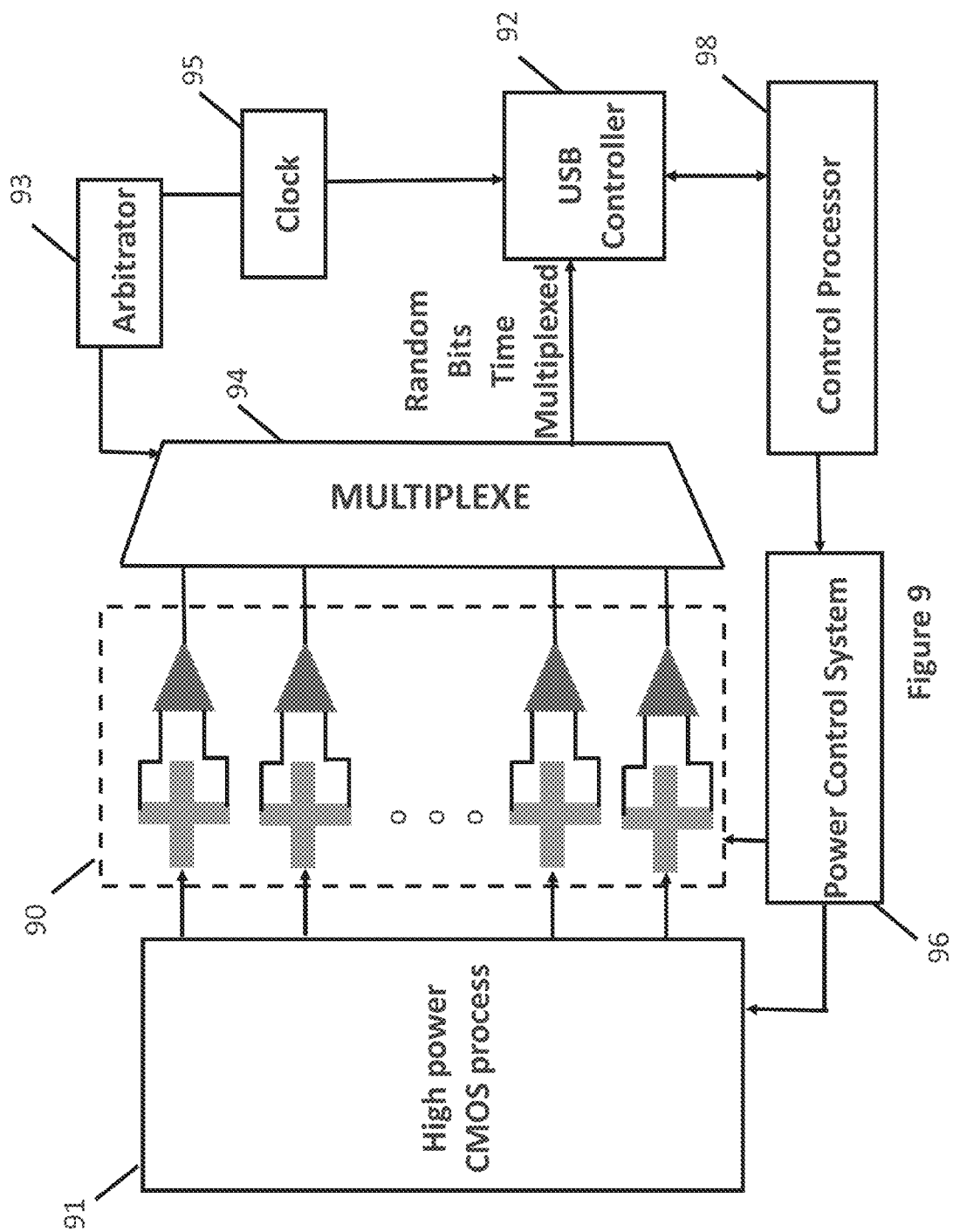
FIG. 9 shows a diagram of system level integration of a random number generator in accordance with embodiments of the invention.

FIG. 9 shows a system level integration of a random number generator in accordance with an embodiment of the invention. Random number bits generated from a readout of each Hall cross structure in a sensor array 90 are fed into a peripheral USB controller 92 through a time multiplexer 94 for higher throughput. The generated bits can be streamed to any commercially available serial communication module. Latest peripheral controllers which are equipped with a USB 3.0 link can support up to 8 GHz throughput. The power for operation of the plug and play random number generator is generated with the help of a power control system 96. The power control system 96 may need to boost a 5V supply available from a control processor like a CPU 98 to provide ~10V power to the circuit. The power control system 96 also supplies a boosted output signal to a high power CMOS process circuit 91, which provides in-phase current pulses to each Hall cross structure in the sensor array 90. A system clock 95 feeds into the USB controller 92 and also an arbitrator 93 (also known as an arbiter) which is connected to the outputs of the sensor array 90 to control which Hall cross structure is to be output from the array 90 for each clock cycle.

Theory

The applicants have shown DW nucleation in Co/Ni perpendicular magnetic anisotropy nanowire at the junction of the Hall cross structure.

There are reports to indicate that current induced DW motion in nanowires with perpendicular magnetic anisotropy (PMA) requires a much lower threshold current compared with in-plane anisotropy counterparts. Moreover, the magnetization of PMA materials is more uniform and does not suffer from thermal instability. A Co/Ni multilayer has proven to be an attractive system due to its large perpendicular anisotropy, low de-pinning field, and large spin polarization, which can be tuned by varying layer thicknesses. DW velocities of the order of 750 m/s have been reported in multilayers of such systems coupled via synthetic antiferromagnetic material. The prior technique proposed to inject DWs in such nanowires involves generation of a local Oersted field by injecting a pulsed current through a non-magnetic metallic strip-line. Recently, there have been reports of an alternate method of DW nucleation in tri-layer stacks. One report suggests spin orbit torque induced perpendicular switching and chirality dependent DW motion in a Pt/Co/AlOx stack; another report suggests joule heating assisted DW nucleation in a Pt/CoFeB/MgO stack. Magnetization reversal in a Co/Ni multilayer through spin orbit torque induced by a spin Hall effect in heavy metal underlayers has also been reported. This method employs an in-plane magnetic field along with an in-plane current to induce magnetization reversal. An efficient method of DW nucleation in Co/Ni multilayers using an in-plane current has also been reported involving an introduced anisotropy gradient at an injection site using ion-irradiation.

As described above, embodiments of the present invention comprise injecting an in-plane pulsed current in a Co/Ni nanowire with a magnetic Hall cross structure such that DWs can be nucleated in the vicinity of the junction of the Hall cross structure, without the need of an Oersted field. DW nucleation in such nanostructures is attributed to a combination of higher demagnetization energy at the junction of the Hall cross structure and the spin transfer torque (STT) effect.

Figure 10A:
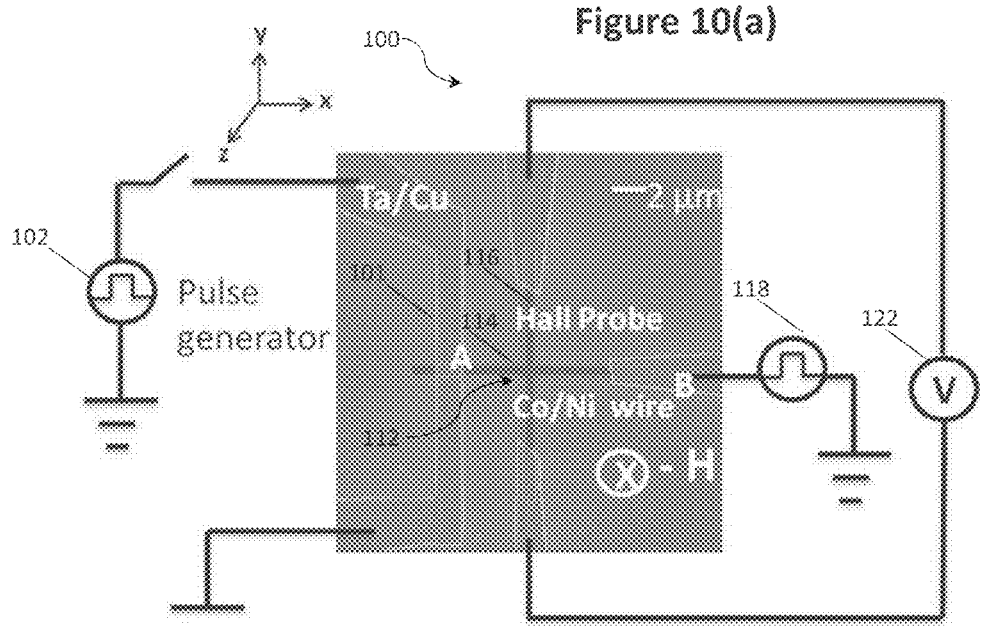
FIG. 10(a) shows a schematic diagram of an embodiment of the present invention.

FIG. 10(a) shows a scanning electron microscopy (SEM) image of apparatus 100, which is similar to that shown in FIG. 1 but further including a metallic strip-line 101 and second in-plane pulsed current generator 102. The apparatus 100 comprises a perpendicular magnetic anisotropy (PMA) Hall cross structure 112 comprising a first nanowire arm 114, extending in the x-direction as drawn, between terminals A and B and a second nanowire arm 116, extending in a y-direction as drawn, through the centre of the first nanowire arm 114. A first in-plane pulsed current generator 118 is connected to terminal B and the second in-plane pulsed current generator 102 is connected to terminal A via the metallic strip-line 101. A sensor 122 in the form of a voltmeter is connected between the ends of the second nanowire arm 116 to (indirectly) measure resistance ($R_{Hall}$) of the Hall cross structure 112 upon DW nucleation. As will be understood by those skilled in the art, by measuring the potential difference (V) using the voltmeter and knowing the current (I) in the system, the resistance (R) can be calculated using Ohm's law (R=V/I). Thus, in operation, the resistance will be calculated from the measured potential difference and this (or the potential difference itself) will provide a value representing a random number.

The Hall cross structure 112 in this example is composed of a 300 nm wide film stack having the following materials and thicknesses (in nm) Ta(3)/Pt(3)/Co(0.25)/[Ni(0.5)/Co(0.25)]4/Pt(3)/Ta(3) was sputter deposited on thermally grown $SiO_2$ substrate at a base pressure of $2 \times 10^{-8}$ Torr. A hard-axis anisotropy field $H_K$ of the Hall cross structure 112 was measured to be 5 kOe. The Hall cross structure 112 was fabricated using electron beam lithography and Ar-ion milling techniques. The two electrodes, A and B, comprising Ta(5 nm)/Cu(100 nm) were formed at both ends of the first nanowire arm 114 to generate a local Oersted field and flow current through the Hall cross structure 112. The presence of DWs was detected using the anomalous Hall effect (AHE) and the Hall resistance ($R_{Hall}$) was measured using a Hall cross structure between the two electrodes A and B. $R_{Hall}$, which is proportional to the perpendicular magnetization of the Hall cross structure 112, was measured using a constant 50 μA bias current. The separation between each electrode A and B and the second nanowire arm 116 was 3.8 μm.

Figure 10B:
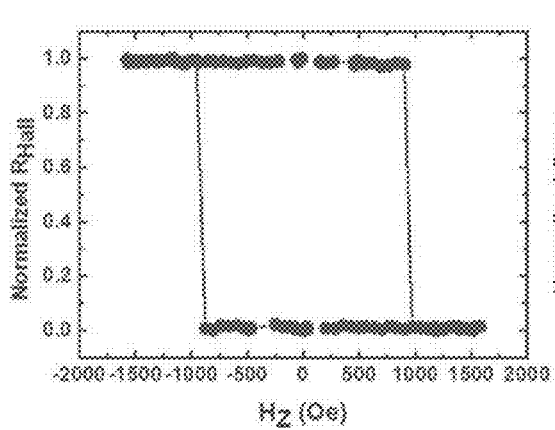
FIG. 10(b) shows dependence of normalized Hall resistance ($R_{Hall}$) on an external magnetic field (R-H loop)

FIG. 10(b) shows normalized $R_{Hall}$ measured by sweeping an external magnetic field along the out-of-plane direction. In this example, +1 normalized $R_{Hall}$ corresponds to field saturation along the −z-direction and 0 $R_{Hall}$ corresponds to saturation along the +z-direction (out-of-plane). A square hysteresis loop was observed, indicating a perpendicular easy axis of magnetization of the first nanowire arm 114. The coercivity of the first nanowire arm 114 was found to be 1 kOe.

Figure 10C:
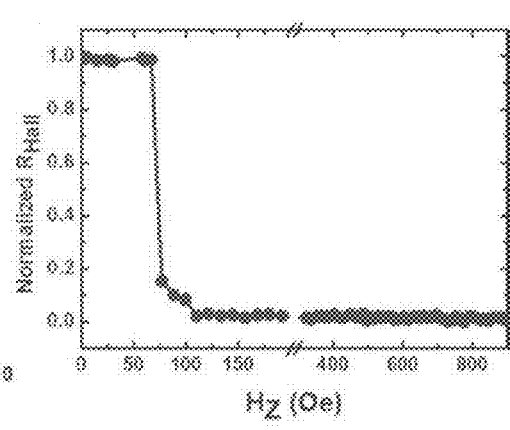
FIG. 10(c) shows measurements of normalized $R_{Hall}$ after introducing a domain wall in the nanowire using an Oersted field generated from a current carrying strip-line.

FIG. 10(c) shows normalized $R_{Hall}$ measured by sweeping an external field after injecting a DW using an Oersted field generated from the metallic strip-line 101. In order to inject a DW the nanowire was first saturated by applying a large (3 kOe) out-of-plane external field along the −z-direction, followed by an application of a current pulse (85 mA, 50 ns) to electrode A. The local Oersted field generated by the pulsed current nucleates a DW near the electrode A. An external magnetic field was applied to drive the DW. As the magnetic field was gradually increased along the +z-direction, two steps were observed in $R_{Hall}$. First step occurred at 60 Oe and corresponds to DW propagation and pinning at the junction of the Hall cross structure 112; the second step occurred at 100 Oe and corresponds to DW de-pinning from the junction of the Hall cross structure 112 and further propagation through the first nanowire arm 114.

Figure 11:
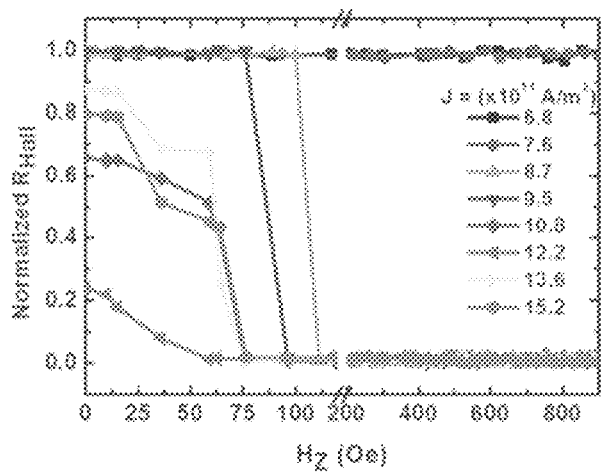
FIG. 11(a) shows measurements of $R_{Hall}$ with an external magnetic field as a function of current density after the application of current pulses.
FIG. 11(b) shows simulated magnetisation state of the system when DWs are nucleated and the entire magnetic volume at the Hall probe is switched.
FIG. 11(c) shows simulated magnetisation state of the system when DWs are driven away from the Hall probe upon application of a pulsed current.
FIG. 11(d) shows a statistical distribution of $R_{Hall}$ as a function of current density.
Figure 11:
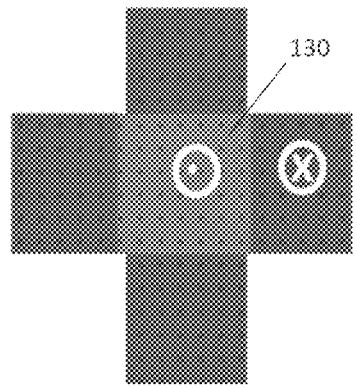
Figure 11:
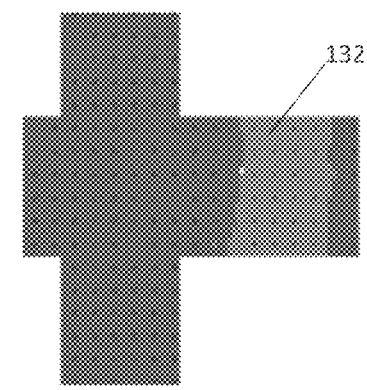
Figure 11:
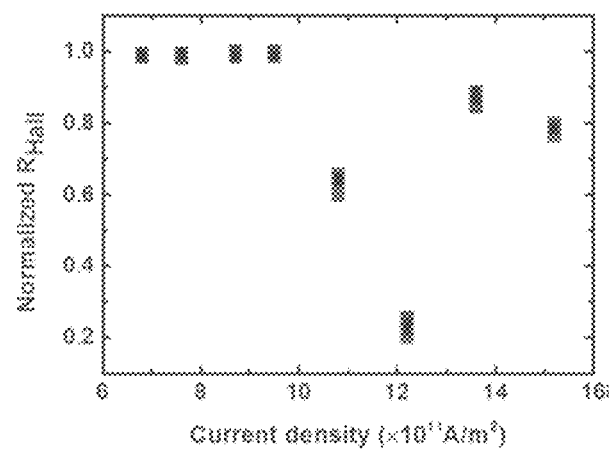

In order to study the effect of an in-plane current on the magnetization reversal of the first nanowire arm 114 with no DW, a pulsed current was applied from electrode B to A after saturating the first nanowire arm 114 in the −z-direction. In this example, the anomalous Hall effect (AHE) was measured using a similar set-up to that described above for FIG. 10(a) for a relatively low hard-axis anisotropy field of 5000 Oe. The density of the pulsed current was varied from $6.8 \times 10^{11}$ A/m² to $1.52 \times 10^{12}$ A/M² while keeping the pulse width constant at 50 ns. After injection of the pulsed current, the external magnetic field was gradually increased in the +z-direction, and change in the $R_{Hall}$ was observed, as shown in FIG. 11(a). When the applied current density was relatively low, there was no significant change in the magnitude of $R_{Hall}$, indicating no change in the magnetization of the first nanowire arm 114. However, when the current density was increased to $8.7 \times 10^{11}$ A/m², a drop in $R_{Hall}$ was observed at a field strength of 150 Oe. This indicates a change in the magnetization of the first nanowire arm 114 at the junction of the Hall cross structure 112. The probability of DW nucleation is higher near the junction of Hall cross structure 112 due to higher demagnetization energy. The higher demagnetization energy lowers the anisotropy at the corners of the junction due to canting of spins. This in turn generates a gradient of the anisotropy within the Hall cross structure 112 near the junction. It is more favourable to reverse the magnetization in the vicinity of junction via DW nucleation than switching the magnetization of the entire Hall cross structure 112. With an increase in the applied current density, the drop in $R_{Hall}$ was found to be at lower field strengths. When the current density was increased above a critical current density corresponding to $1.08 \times 10^{12}$ A/m², the application of the current pulse itself reduced the magnitude of $R_{Hall}$ without the need of the external magnetic field after the current pulse injection. The magnitude of $R_{Hall}$ depends on the magnetic volume switched at the junction.

FIG. 11(b) shows a micro-magnetic simulation configuration depicting the magnetization of the Hall cross structure 112 when four DWs are nucleated due to magnetization reversal at the junction. At relatively low magnetic field strength and low current density, the central portion 130 in FIG. 11(b) (with reversed magnetization) would be less in volume. This indicates less switched magnetic volume at the junction of the Hall cross structure 112. As magnetic field is increased in the out-of-plane direction, the DWs would move away from each other and the magnetization of the junction would also switch. This would be detected as drop in the $R_{Hall}$. When the field was swept in the +z-direction, the normalized $R_{Hall}$ dropped in two steps indicating the switched domain expansion and de-pinning at the junction of the Hall cross structure 112. When the magnetic volume at the junction is completely switched, as shown in FIG. 11(b), the external field that is required to switch the Hall cross structure 112 should be the same for all current densities. The Hall cross structure 112 is switched by two DWs moving in opposite directions along it, i.e., stretching the magnetization of the junction. This value corresponds to the DW de-pinning from the junction of the Hall cross structure 112 and is close to 75 Oe for all the subsequent applied current densities, as shown in FIG. 11(a). At an applied current density of $1.22 \times 10^{12}$ A/m$^2$, the $R_{Hall}$ reached a minimum indicating the switching of a large volume of the junction of the Hall cross structure 112. When four DWs are present at the junction of the Hall cross structure 112, the spin configuration is also affected. Further increase in the current density reduces the drop in $R_{Hall}$, indicating DW displacement away from the junction of the Hall cross structure 112. The above can be explained by considering the pinning and de-pinning strength of the DWs at the junction of the Hall cross structure 112. It has been shown that DWs would experience repulsion at the junction of the Hall cross structure 112 and precession until the field is strong enough to de-pin the DW from the junction. At a low current density, the DW is not able to overcome the potential due to the Hall cross structure 112 and is pinned in the vicinity of the junction. At this current density ($1.22 \times 10^{12}$ A/m$^2$), the $R_{Hall}$ drops to its minimum value. When the current density increases beyond this threshold value, the DWs are de-pinned from the junction and are able to propagate further in the Hall cross structure 112 as shown by the portion 132 in the simulated configuration in FIG. 11(c). At this point, the DWs are nucleated and driven simultaneously by the spin transfer torque (STT) effect.

A similar process of DW nucleation and motion has been reported in the prior art where they attribute the DW nucleation in the perpendicular magnetic anisotropy (PMA) region to the process of extraction of a DW from an in-plane magnetized (IMA) region to a PMA region by STT. In this case, the 90° magnetization boundary formed between the PMA and IMA regions is due to an anisotropy gradient introduced by ion-irradiation which acts as the nucleation site for the DW. In embodiments of the present invention, the anisotropy gradient is naturally generated at each of the four edges/corners forming the junction of the Hall cross structure 112. This produces a non-uniform magnetization at the corners of the Hall cross structure 112. The canted spins resulting due to the fringing field at the four corners of the junction are driven by the STT effect and are responsible for domain wall nucleation and propagation. After the DW is de-pinned from the junction, the spin configuration inside the junction of the Hall cross structure 112 reverts to the original magnetization state and the $R_{Hall}$ recovers to its original value. When the current direction is reversed, $R_{Hall}$ again drops indicating motion of reversed domain walls towards the junction.

FIG. 11(d) shows a plot of normalized $R_{Hall}$ after the application of a current pulse. Each of the measurements was repeated 20 times to check for repeatability. The extent of spread in $R_{Hall}$ indicates the non-uniformity in reversed magnetization volume at the junction which clearly exhibits the presence of stochasticity in the DW nucleation process. Moreover, there is a possibility of multiple DW generation contributing to stochasticity.

Figure 12:
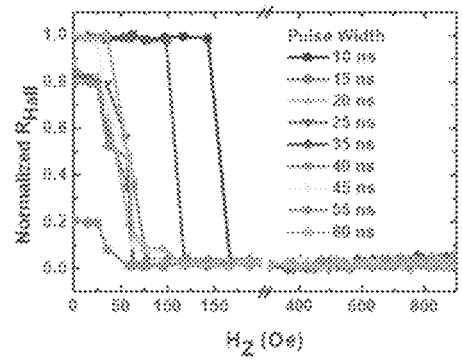
FIG. 12(a) shows measurements of $R_{Hall}$ with an external magnetic field as a function of pulse width after the application of current pulses.
FIG. 12(b) shows a statistical distribution of $R_{Hall}$ as a function of pulse width.
FIG. 12(c) shows a schematic depicting a possible scenario showing multiple DW nucleation and propagation across the Hall junction: (i) DW nucleation via expansion of reversed magnetic domains at the Hall junction; (ii) depinning and propagation of DW away from the Hall junction; (iii) nucleation and expansion of second DW at the Hall junction.
FIG. 12(d) shows statistical distribution of $R_{Hall}$ as a function of pulse width for larger nanowire dimensions of (i) 2 μm and (ii) 1.5 μm, respectively.
Figure 12:
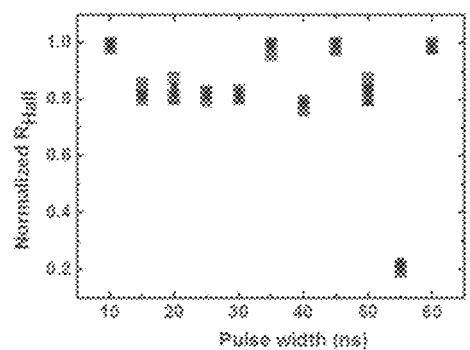
Figure 12:
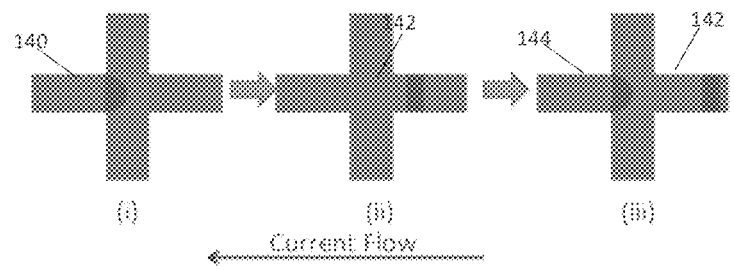
Figure 12:
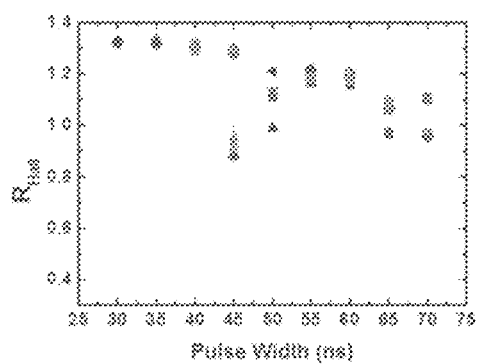
Figure 12:
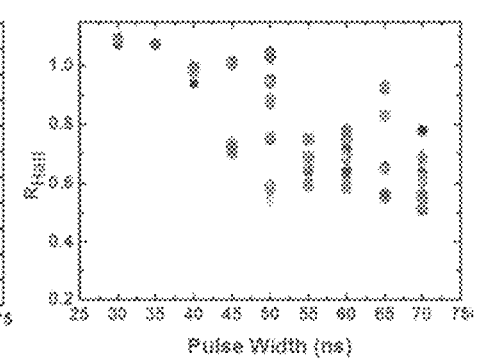

FIG. 12(a) shows the variation in normalized $R_{Hall}$ as magnetic field is swept after the application of a current pulse, for various pulse widths keeping the current density constant at $1.22 \times 10^{12}$ A/m$^2$. In this example, AHE measurements were again made using a device with a relatively low hard-axis anisotropy field of 5000 Oe and the trend in $R_{Hall}$ is similar to the one obtained previously in FIG. 11(a). When the pulse width is low (10 ns), the reduction in $R_{Hall}$ occurs at a larger field strength. This implies that at low operating power, current alone is insufficient to reverse the magnetization in the Hall cross structure 112; it requires assistance of an external field. Once the DWs are nucleated, the field required to de-pin the DW from the junction of the Hall cross structure 112 is less than 100 Oe. The drop in $R_{Hall}$ to 0 occurs at around 75 Oe as observed from the previous result.

FIG. 12(b) shows a graph of normalized $R_{Hall}$ measured immediately after the application of a current pulse (with no external field applied after the current pulse). Each of the measurements was repeated 20 times to check for repeatability. From the graph, it is observed that for a pulse width of less than 15 ns there is no drop in $R_{Hall}$, indicating no DW nucleation at the junction. When the pulse width is between 15 ns and 50 ns, $R_{Hall}$ varies between 1 and 0.8 indicating either no reversal or slight reversal at the corners of the junction. At 55 ns, $R_{Hall}$ drops to its minimum value indicating maximum reversal of magnetic domains at the junction of the Hall cross structure 112. By increasing the pulse width further to around 60 ns, $R_{Hall}$ recovers to its maximum value indicating de-pinning of the DWs from the junction similar to the observation of FIG. 11(c). This also indicates a possibility of multiple DW generation as shown in the schematic of FIG. 12(c). In particular, FIG. 12(c)(i) shows DW 140 nucleation via expansion of reversed magnetic domains at the junction of the Hall cross structure 112; FIG. 12(c)(ii) shows de-pinning and propagation of a DW 142 away from the junction; and FIG. 12(c)(iii) shows nucleation and expansion of a second DW 144 at the junction of the Hall cross structure 112. In summary, the distribution of $R_{Hall}$ indicates a presence or absence of DWs at different pulse widths and current densities.

In addition, measurements with respect to pulse width for two different dimensions of the first nanowire arm 114 (corresponding to 2 μm and 1.5 μm, respectively) have been performed and are shown in FIGS. 12(d)(i) and 12(d)(ii). It is observed that when the pulse width is less than 40 ns there is no change in the $R_{Hall}$ indicating no DW nucleation at the junction. As the pulse width increases, there is a drop in the $R_{Hall}$. The measurements were repeated 20 times at each pulse width. The magnitude of drop is different for each set of measurements as indicated by the spread in the $R_{Hall}$ values. Even though there is no clear trend in FIGS. 12(d)(i) and 12(d)(ii), the results appear slightly skewed indicating a larger drop at larger pulse widths. The large spread in the $R_{Hall}$ indicates variation in the reversed domain volume with current pulses near the junction of the Hall cross structure 112. These results suggest the possibility of stochasticity in the DW generation process using in-plane pulsed current.

The effect of a pulsed current on $R_{Hall}$ for devices with a large anisotropy field has also been studied. In this example, the layer thicknesses of a Co/Ni thin film stack was tuned to obtain a hard-axis anisotropy field of 7 kOe. The thin film was patterned into a Hall cross structure similar to the one shown in FIG. 10(a). The $R_{Hall}$ was measured by sweeping the out-of-plane magnetic field and a square hysteresis loop was obtained indicating perpendicular easy axis of magnetization. The coercivity of the Hall cross structure 112 obtained was 650 Oe.

Figure 13:
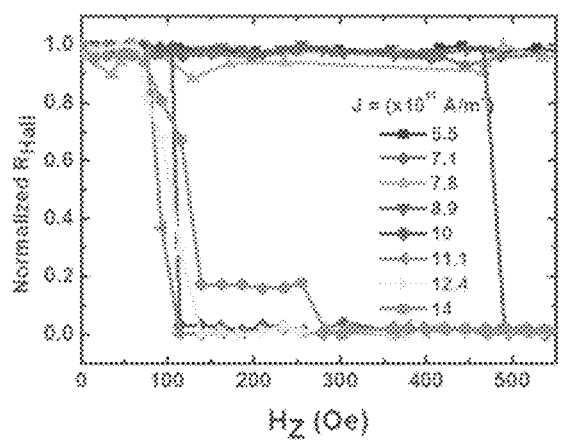
FIG. 13(a) shows measurements of $R_{Hall}$ with an external magnetic field as a function of current density after the application of current pulses for a device with a large hard-axis anisotropy field of 7000 Oe.
FIG. 13(b) shows a switching field distribution as a function of current density for a device with a large hard-axis anisotropy field of 7000 Oe.
Figure 13:
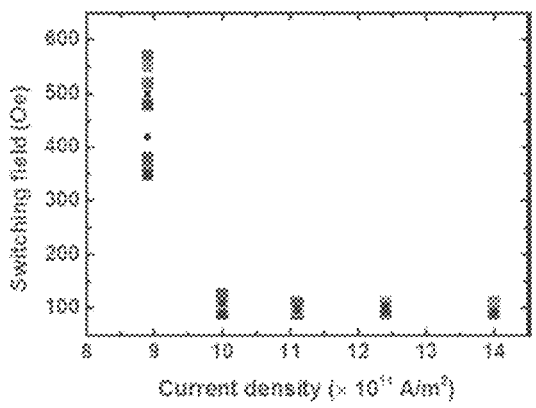

FIG. 13(a) shows the variation of normalized $R_{Hall}$ as magnetic field is swept after the application of a current pulse in the Hall cross structure 112. The current density was varied from $5.5 \times 10^{11}$ A/M$^2$ to $1.4 \times 10^{12}$ A/M$^2$ and there was no change in the $R_{Hall}$ until the current density was kept below $7.8 \times 10^{11}$ A/m$^2$. When the applied current density was $8.9 \times 10^{11}$ A/m$^2$, there was a drop in $R_{Hall}$ at a field strength of 480 Oe. This indicates that the current density may initiate changes in the spin orientation but it is not high enough for magnetization reversal at the junction of the Hall cross structure 112, which occurs at relatively high field strength. As the current density was increased to $1 \times 10^{12}$ A/m$^2$, the drop in $R_{Hall}$ occurred at a much lower field strength (100 Oe). Thus, there is a sudden transition in the magnetization reversal process. The trend in $R_{Hall}$ was similar to the one observed previously as the current density was increased.

In all of the FIG. 13(a) results, it is to be noted that there is no change in the magnitude of $R_{Hall}$ without a field sweep after the current pulse injection, unlike in the previous case of lower anisotropy field devices, where the $R_{Hall}$ was reduced by the application of a current pulse alone. This observation points to the fact that magnetization reversal can occur more readily for devices with lower anisotropy field strength.

FIG. 13(b) shows a plot of switching field distribution of the $R_{Hall}$ at different applied current density values. Each of the measurements was repeated 20 times to obtain a distribution of the field at which $R_{Hall}$ switches. At a current density value of $8.9 \times 10^{11}$ A/m$^2$, the switching field appears to have a larger spread. As the current density increases, there is a drop in the switching field and the spread also became narrower. The spread in $R_{Hall}$ depends on the sample geometry and surface irregularities. The nucleation of DWs would be preferably triggered at geometrical in-homogeneities or at the junction of the Hall cross structure 112 as described above. The results in FIG. 13(b) are similar to those obtained in FIG. 13(a), where the $R_{Hall}$ drops at a larger pulse width and current alone is not sufficient to cause magnetization reversal.

Nucleation of multiple DWs at the junction of a Hall cross structure in a Co/Ni nanowire have been demonstrated by the application of an in-plane pulsed current without using a local Oersted field. From the experiments described above, it appears that this phenomenon is more apparent in material with a low magnetization anisotropy (e.g. $1 \times 10^5$-$1 \times 10^6$ ergs/cc). For materials with high anisotropy strength (e.g. $2 \times 10^6$-$4 \times 10^6$ ergs/cc), current alone was not sufficient to cause magnetization reversal. These observations may have been ignored by previous studies where the focus was on DW nucleation using an Oersted field.

The magnitude of the applied current density and pulse width was found to control the $R_{Hall}$ by modulating the reversed magnetic volume at the junction of the Hall cross structure. The large spread of results indicates variation in reversed domains and nucleation of multiple DWs which manifests the stochastic nature of the DW generation process. In effect, the Hall resistance varies for each measurement. With multiple Hall cross structures fabricated on a single nanowire, the stochastic nature of the DW nucleation can lead to random number generation at each Hall cross structure when an in-plane current is applied.

The change in Hall resistance in a Hall cross structure with perpendicular magnetic anisotropy, detected using anomalous Hall effect, is governed by the magnetic volume switched at the Hall junction, which can be tuned by varying the magnitude of the applied current density and pulse width. The nucleated DWs are driven simultaneously under the spin transfer torque effect when the applied current density is above a threshold. The presence or absence of DWs at the Hall junction is detected by drop or increase in Hall resistance. The possibility of multiple DW generation and variation in magnetic volume switched makes the nucleation process stochastic in nature. This is manifested as a variation of the Hall resistance at a particular current density and pulse width, which can be converted into a value for a random number. Accordingly, embodiments of the present invention provide magnetic random number generators.

Although only certain embodiments of the present invention have been described in detail, many variations are possible in accordance with the appended claims.

The invention claimed is:

1. A magnetic random number generator comprising:
   a) a Hall cross structure comprising at least one magnetic nanowire with perpendicular magnetic anisotropy;
   b) an in-plane pulsed current generator operable to generate stochastic nucleation of domain walls (DWs) in the Hall cross structure; and
   c) a sensor configured to measure a parameter of the Hall cross structure upon DW nucleation, wherein said parameter has a value representing a random number.

2. The magnetic random number generator according to claim 1 further comprising:
   a plurality of Hall cross structures; and
   a plurality of sensors configured to measure said parameter for each of the plurality of Hall cross structures;
   wherein the plurality of Hall cross structures are operationally connected to the in-plane pulsed current generator so as to generate a multiple bit random number.

3. The magnetic random number generator according to claim 1 wherein the Hall cross structure comprises a magnetic Hall bar.

4. The magnetic random number generator according to claim 1 wherein the Hall cross structure comprises a non-magnetic metal Hall bar.

5. The magnetic random number generator according to claim 4 wherein the Hall bar comprises Tantalum.

6. The magnetic random number generator according to claim 1 wherein the parameter is resistance or potential difference.

7. The magnetic random number generator according to claim 1 wherein the nanowire has a width of 500 nm or more.

8. The magnetic random number generator according to claim 1 wherein the nanowire has a width of 10 nm or more.

9. The magnetic random number generator according to claim 1 wherein the in-plane pulsed current generator is configured to generate current pulses having a current density of or above $1 \times 10^{10}$ A/m$^2$.

10. The magnetic random number generator according to claim 1 wherein the in-plane pulsed current generator is configured to generate current pulses having a pulse width of or above 20 ns.

11. A method of generating a random number comprising:
   a) generating stochastic nucleation of domain walls (DWs) in a Hall cross structure comprising at least one magnetic nanowire and perpendicular magnetic anisotropy using an in-plane pulsed current; and
   b) measuring a parameter of the Hall cross structure upon DW nucleation, wherein said parameter has a value representing a random number.

* * * * *